United States Patent [19]

Tomura et al.

[11] Patent Number: 5,254,602
[45] Date of Patent: Oct. 19, 1993

[54] CURABILITY-IMPARTING COMPOSITION, METHOD FOR CURING WITH SAID COMPOSITION, AND METHOD FOR PRODUCTION OF GLASS FIBER-REINFORCED PLASTIC

[75] Inventors: Yoshihiro Tomura; Shigeki Banno, both of Aichi, Japan

[73] Assignee: Nippon Oil & Fats Co., Ltd., Tokyo, Japan

[21] Appl. No.: 837,617

[22] Filed: Feb. 21, 1992

Related U.S. Application Data

[63] Continuation of Ser. No. 408,386, Sep. 18, 1989, abandoned.

[30] Foreign Application Priority Data

Oct. 1, 1988 [JP] Japan .................. 63-245891

[51] Int. Cl.$^5$ .......... C08F 2/50; C08L 67/06; C08K 5/07; C08K 5/14
[52] U.S. Cl. ............... 522/24; 156/175; 522/83; 522/107; 522/26; 522/14; 523/527; 525/21
[58] Field of Search ........ 522/107, 24; 523/527; 525/21

[56] References Cited

U.S. PATENT DOCUMENTS

| | | | |
|---|---|---|---|
| 4,071,424 | 1/1978 | Dart | 522/18 |
| 4,089,762 | 5/1978 | Frodsham | 522/14 |
| 4,235,686 | 11/1980 | Dart | 522/18 |
| 4,369,223 | 1/1983 | Phillips | 522/103 |
| 4,459,193 | 7/1984 | Ratcliffe | 522/24 |
| 4,746,685 | 5/1988 | Masuhara | 522/24 |
| 4,751,102 | 6/1988 | Adair | 522/26 |
| 4,766,055 | 8/1988 | Kawabata | 522/24 |

FOREIGN PATENT DOCUMENTS

| | | |
|---|---|---|
| 665948 | 7/1963 | Canada .......... 522/24 |
| 54-10986 | 5/1979 | Japan . |
| 57-128702 | 8/1982 | Japan . |
| 57-59246 | 12/1982 | Japan . |
| 57-202304 | 12/1982 | Japan . |
| 608047 | 2/1985 | Japan . |
| 608241 | 3/1985 | Japan . |

OTHER PUBLICATIONS

Encyclopedia of Polymer Science and Engineering, vol. II, John Wiley & Sons, New York, pp. 1–13.
Tomura et al. Reinforced Plastics, vol. 35, No. 8 (1989), pp. 316–318.
Lubin—"Handbook of Composites", Van Nostrand Reinhold Co. 1982, pp. 18,19.
Translation of Kitamura, Japan Kokai 57-128702.
Patent Abstracts of Japan, vol. 6, No. 223, Nov. 1982, for J57128702 (Kitamura).

Primary Examiner—Marion E. McCamish
Assistant Examiner—Arthur H. Koeckert
Attorney, Agent, or Firm—Oblon, Spivak, McClelland, Maier & Neustadt

[57] ABSTRACT

A photocurable compound prepared as a starting material by incorporation therein of a composition comprising a fluorescein compound photoreducing dye, tribenzylamine, and at least one specific peroxide permits production of a shaped article which, on exposure to visible light, exhibits high curability and acquires hardness virtually indiscriminately on the obverse and reverse sides of the article. A mixture comprising both or either of an unsaturated polyester resin and an epoxy acrylate resin which are photocurable compounds, glass fibers, and a specific peroxide, is convenient for the production of specific cured shaped articles particularly by the filament winding technique or the drawing technique.

12 Claims, No Drawings

CURABILITY-IMPARTING COMPOSITION, METHOD FOR CURING WITH SAID COMPOSITION, AND METHOD FOR PRODUCTION OF GLASS FIBER-REINFORCED PLASTIC

This application is a continuation of application Ser. No. 07/408,386, filed on Sep. 18, 1989, now abandoned.

BACKGROUND OF THE INVENTION

1. Field of the Invention

This invention relates to a composition for imparting curability to a specific photocurable compound as a starting material on exposure to visible light, a method for curing by exposure to visible light a compound prepared as a starting material by incorporation therein of the composition, and a method for the production of a glass fiber-reinforced plastic. The use of the composition of this invention allows the photocurable compound to cure quickly. A cast plate and a glass fiber-reinforced plastic (hereinafter referred to briefly as "FRP") plate formed in a thickness in the range of 1 to 10 mm and cured acquire hardness virtually indiscriminately on the obverse and reverse sides thereof and enjoy perfect curing.

2. Prior Art Statement

It has been known that a radically polymerizable monomer can be cured in the form of incorporating therein a photocuring agent on exposure to ultraviolet rays (hereinafter referred to briefly as "UV") or visible light. Particularly, the practice of using UV for the curing of such films as are used for surface coating and in inks has found wide recognition.

In curing a thick film or FRP having a thickness of more than 1 mm, however, the UV curing is not suitable because the rays are absorbed by the resin or glass fibers and consequently the shaped article is not allowed to be cured to the core.

The practice of utilizing visible light for photocuring the thick film or FRP more than 1 mm in thickness has been known to the art.

The curing method resorting to exposure to visible light has been reported variously as follows.

Japanese Patent Publication SHO 60(1985)-15656, for example, discloses a photocuring agent which is a combination of a derivative of benzoyl oxime carbonate ester, a photoreducing dye such as eosin, for example, and a tertiary amine.

The curing methods using a combination of an α-diketone and a tertiary amine are disclosed in Japanese Patent Publication SHO 54(1979)-10986, Japanese Patent Publication SHO 57(1982)-59246 and Japanese Patent Publication SHO 60(1985)-8241, for example.

An invention using an acylphosphine oxide as a photocuring agent is disclosed in Japanese Patent Publication SHO 60(1985)-8047. Further, methods using a peroxide in combination with a curing agent have been known to the art. For example, Japanese Patent Publication SHO 57(1982)-202304 discloses a photocuring agent comprising a curing agent combined with benzophenone or benzil, and one of peroxides consisting of t-butyl peroxybenzoate, methyl ethyl ketone peroxide and cyclohexanone peroxide.

The conventional methods mentioned above have their own problems as follows.

When the curing agent combining a derivative of benzoyl oxime carbonate ester, a photoreducing dye and a tertiary amine is used, the curing time required for the resin is as long as or exceeds 20 minutes, the cured resin is deficient in hardness, and the insufficiency of hardness is conspicuous particularly on the side of the cured resin opposite to the side exposed to the light.

In the case of the use of a combination of an α-diketone and a tertiary amine, the use of an acylphosphine oxide, and the combined use of a photocuring agent and a peroxide, their effective application to FRP is difficult because the curing compounds as a starting material polymerize only in low conversion.

None of the resins using the known curing agents capable of providing desired curing by virtue of exposure to visible light has demonstrated the characteristics in that the curing proceeds quickly and produces a cured film having a large thickness in the range of 1 to 10 mm and that the shaped article of resin produced by the curing exhibits highly desirable properties, particularly high hardness, uniformly throughout the volume thereof and manifests this high hardness virtually indiscriminately on the obverse and reverse sides of the shape article.

Further, in the production of FRP from a polyester resin or an epoxy acrylate resin as a raw material, there is employed a method for curing the resin by mixing the resin with a curing agent and exposing the resultant mixture to a light. None of the known curing agents is practically suitable for this method, however, because the cured shaped article of resin produced by using the curing agent exhibits hardness discriminately on the obverse and reverse sides of the shaped article.

An object of this invention is to provide a composition capable of imparting curability to a photocurable compound as a starting material on exposure to visible light and allowing the photocurable compound incorporating the composition to cure quickly and produce a cured shaped article which, in the form of a film about 1 to 10 mm in thickness, exhibits hardness virtually indiscriminately on the obverse and reverse sides of the shaped article. Another object of this invention is to provide a method for curing the photocurable compound as a raw material by the use of the composition.

Still another object of this invention is to provide a method for the production of FRP which cures FRP more quickly than the methods generally used, the FRP in the cured form exhibiting hardness virtually indiscriminately on the obverse and reverse sides thereof.

SUMMARY OF THE INVENTION

To accomplish the objects described above according to the present invention, there is provided a composition for imparting curability to a photocurable compound as a raw material on exposure to visible light, which composition comprises (a) a fluorescein compound photoreducing dye, (b) tribenzylamine, and (c) at least one peroxide selected from the group consisting of ketone peroxides, hydroperoxides, diacyl peroxides, peroxy esters, peroxy dicarbonates, and peroxy monocarbonates in proportions respectively in the range of 0.016 to 1 part by weight, 0.1 to 5 parts by weight, and 0.2 to 5 parts by weight, based on 100 parts by weight of the raw material; a method for curing a photocurable compound as a raw material, which method comprises mixing 100 parts by weight of the raw material with 0.016 to 1 part by weight of a fluorescein compound photoreducing dye, 0.1 to 5 parts by weight of tribenzylamine, and 0.2 to 5 parts by weight of at least one peroxide selected from the group consisting of ketone peroxides, hydroperoxides, diacyl peroxides, peroxy esters, peroxy dicarbonates, and peroxy monocarbonates and exposing the resultant mixture to visible light; and a method for the production of a glass fiber-reinforced plastic, essentially comprising the steps of mixing glass fibers with at least one resin as a raw material selected from the group consisting of unsaturated polyester resins and epoxy acrylate resins, adding to the resultant glass fiber-containing resin a mixture obtained by mixing 0.016 to 1 part by weight of a fluorescein compound photoreducing dye, 0.1 to 5 parts by weight of tribenzylamine, and 0.2 to 5 parts by weight of at least one peroxide selected from the group consisting of peroxy monocarbonates, peroxy esters possessing a 10-hour half-life temperature of not lower than 70° C. and diacyl peroxides possessing a 10-hour half-life temperature of not lower than 70° C., based on 100 parts by weight of the raw material, blending the resultant mixture, and then curing the blended mixture.

DETAILED DESCRIPTION OF THE PREFERRED EMBODIMENT

The composition of this invention, owing to the particular kinds of photopolymerization initiators and sensitizers to be combined, imparts high curability to the photocurable compound as a raw material on exposure to visible light.

Now, the components which make up the composition of this invention and the components which make up the composition involved in the method of this invention will be described below.

First, the fluorescein compound photoreducing dye is specifically a compound possessing the following structure. The compounds of this structure are divided by the kinds of substituents, $R_1$ to $R_{10}$, into the following four groups.

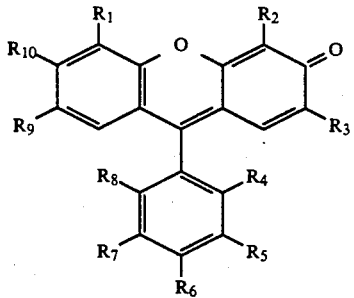

First group:
  The compounds having Br each for $R_1$ and $R_2$, COONa or COOH for $R_4$, $NO_2$ or Br for each of $R_3$ and $R_9$, ONa or OH for $R_{10}$, and H each for $R_5$ to $R_8$.
Second group:
  The compounds having I each for $R_1$, $R_2$, $R_3$, and $R_9$, COONa or COOH for $R_4$, ONa or OH for $R_{10}$, and H each for $R_5$ to $R_8$.
Third group:
  The compounds having I each for $R_1$, $R_2$, $R_3$, and $R_9$, ONa or OH for $R_{10}$, COONa or COOH for $R_4$, and Cl each for $R_5$ to $R_8$.
Fourth group:
  The compounds having a halogen such as Br, Cl, or I for at least one group from among $R_1$, $R_2$, $R_3$, $R_5$, $R_7$, and $R_9$, COONa or COOH for $R_4$, and ONa or OH for $R_{10}$.

These groups of compounds may be represented respectively by the following concrete compounds:
  Eosin as a typical compound of the first group of compounds.
  Erythrosin as a typical compound of the second group of compounds.
  Rose bengal as a typical compound of the third group of compounds.
  Dibromofluorescein as a typical compound of the fourth group of compounds.

The amount of the fluorescein compound photoreducing dye mentioned above to be added to the photocurable compound as a raw material is in the range of 0.016 to 1 part by weight, preferably 0.12 to 0.5 part by weight, based on 100 parts by weight of the raw material.

If the amount of addition mentioned above is less than 0.016 part by weight, the curing of the raw material proceeds slowly and the cured resin possesses a viscid surface. Conversely, if this amount exceeds 1 part by weight, the phenomenon of quenching ensues and the curing therefore proceeds slowly and, what is more, the excess is wasted without bringing about any economic benefit.

The amount of tribenzylamine to be added to the photocurable compound as a raw material is in the range of 0.1 to 5 parts by weight, preferably 0.5 to 3 parts by weight, based on 100 parts by weight of the raw material.

If the amount of addition mentioned above is less than 0.1 part by weight, the curing of the raw material proceeds slowly and the cured resin possesses a viscid surface. Conversely, if this amount exceeds 5 parts by weight, the excess is simply wasted without bringing about the economic benefit of enhancing the curing speed and the degree of curing.

The specific selection of tribenzylamine for use in the composition of this invention is because the curing proceeds slowly and the degree of curing is low when other tertiary amines such as triethylamine are used.

The peroxide for use in the composition is selected from the group consisting of ketone peroxides such as methylethyl ketone peroxide and cyclohexanone peroxide; hydroperoxides such as t-butyl hydroperoxide, cumene hydroperoxide, and t-hexylperoxide; diacyl peroxides such as benzoyl peroxide, 2,4-dichlorobenzoyl peroxide, lauroyl peroxide, and toluyl peroxide; peroxy esters such as t-butyl peroxy-2-ethylhexanoate, t-butyl peroxypivalate, t-butyl peroxybenzoate, and di(t-butyl peroxy)-isophthalate; peroxy monocarbonates such as t-butyl peroxy isopropyl carbonate, t-butyl peroxy-2-ethylhexyl carbonate, and diethylene glycol bis(t-butyl peroxycarbonate); and peroxy dicarbonates such as dimyristyl peroxy dicarbonate, di-2-ethylhexyl peroxy dicarbonate, and bis(4-t-butyl cyclohexyl) peroxy dicarbonate.

The peroxide is decomposed through photosensitization by the photoreducing dye and tribenzylamine to generate a radical. Any peroxide other than the peroxides enumerated above is not decomposed through photosensitization.

The amount of the aforementioned peroxide to be added to the photocurable compound as a raw material is in the range of 0.2 to 5 parts by weight, preferably 0.5 to 4 parts by weight, based on 100 parts by weight of the raw material.

If the amount of this addition is less than 0.2 part by weight, the degree of curing is not sufficient. Conversely, if this amount exceeds 5 parts by weight, the excess is simply wasted without bringing about the economic benefit of appreciably enhancing the curing speed and the degree of curing.

The peroxides mentioned above are used either singly or in the form of a combination of two or more members.

This invention embraces a method for curing the photocurable compound as a raw material by mixing the components of the composition with the photocurable compound are exposing the resultant mixture to a light.

In the curing of the photocurable compound as a raw material containing the curability-imparting composition of this invention, the curability-imparting composition exhibits an outstanding characteristic when the compound is shaped in the form of a film 1 to 10 mm in thickness or when the compound prepared in a form containing glass fibers is shaped to produce FRP, for example. The cured shaped article acquires a high degree of curing and exhibits hardness virtually indiscriminately on the obverse and reverse sides of the shaped article.

This invention further embraces a method for the production of a glass fiber-reinforced plastic using a special raw material and a special peroxide. The raw material to be used in this method is at least one member selected from the group consisting of unsaturated polyester resins and epoxy acrylate resins and the peroxide is at least one member selected from the group consisting of peroxy monocarbonates, peroxy esters possessing a 10-hour half-life temperature of not lower than 70° C., and diacyl peroxides of equal quality. The fluorescein compound photoreducing dye and the tribenzylamine to be used in this method are identical with those which are used in the curing of the photocurable compound as a raw material. The amounts of these components to be added to the resin are also identical with those to be used in the aforementioned method for curing the photocurable compound as a raw material.

The method for the production of the glass fiber-reinforced plastic using the aforementioned special peroxide is particularly suitable for the pultrusion or filament winding method.

The monomer or resin which incorporates the composition of this invention capable of causing desired curing on exposure to visible light exhibits a short pot life, depending on the particular kind of peroxide described above. For example, the composition capable of causing desired curing on exposure to visible light which incorporates a ketone peroxide, a hydroperoxide, a peroxy dicarbonate or a peroxy ester or diacyl peroxide having a 10-hour half-life temperature of lower than 70° C. possesses a pot life in the range of 0.5 to 3 hours.

When the same composition incorporates a peroxy monocarbonate or a peroxy ester or diacyl peroxide having a 10-hour half-life temperature of not lower than 70° C. as described above, however, the pot life of the composition is in the range of 6 to 100 hours.

However, there are cases where the shortness of pot life does not matter much. Where FRP is formed by the spray-up method, for example, the pot life is not required to be so long because the curing agent and the resin are stored in separate tanks.

The longness of pot life proves to be advantageous where the curing agent and the resin are premixed and then put to use as in the filament winding method or the drawing method.

The resin containing the peroxide specified above, namely a peroxy monocarbonate or a peroxy ester or diacyl peroxide having a 10-hour half-life temperature of not lower than 70° C., exhibits a long pot life. This specific peroxide, therefore, is suitable as a component for the composition of this invention which functions to impart the property of causing desired curing on exposure to visible light to the curable compound to be used as a raw material in the filament winding method or drawing method.

The compound as a raw material to which the composition of this invention is intended to impart the property of inducing desired curing on exposure to visible light is a radically polymerizable monomer or resin of popular use.

The radically polymerizable monomers and resins which are usable as raw-material compounds herein include acrylic esters, methacrylic esters, fumaric esters, styrene, vinyl acetate, unsaturated polyesters, epoxy (meth)acrylates, polyester (meth)acrylates, and urethane (meth)acrylates, for example.

These monomers and resins may be used either singly or in the form of a combination of two or more members.

The visible light which is used in the present invention is a light having a wavelength in the range of 300 to 600 nm. The sources for this visible light which are usable herein include fluorescent lamps, xenon arc lamps, metal halide lamps, tungsten lamps, and sunrays, for example.

Where glass fibers are added to the compound as a raw material, the highest allowable content of the glass fibers in the glass fiber-reinforced plastic is 90% by weight. If this content exceeds 90% by weight, the glass fiber-reinforced plastic does not permit easy penetration of light and cannot be sufficiently cured. Practically, it is desirable to fix the upper limit of the glass fiber content at 80% by weight.

The photocurable compound as a raw material which incorporates therein the composition of this invention capable of imparting to the compound the property of causing desired curing on exposure to visible light, occasionally further containing glass fibers for reinforcement, allows production of a shaped article exhibiting high hardness and manifesting the hardness virtually indiscriminately on the obverse and reverse sides of the shaped article.

This invention is embodied equally advantageously when the curability-imparting composition is required to have a long pot life as in the operation of the filament winding or drawing method and when the composition is not required to have a long pot life as in the operation of the spray-up method.

EXAMPLES 1 AND 2

A varying composition as a visible light-curing agent indicated herein below was incorporated in an amount also indicated herein below in 100 parts by weight of an unsaturated polyester resin consisting of 65 parts by weight of an unsaturated polyester prepared by the condensation of 1 mol of orthophthalic acid, 1 mol of fumaric acid, and 2 mols of propylene glycol and possessing an average molecular weight of 2,700 and 35 parts by weight of styrene monomer. The resultant mixture was exposed to visible light and tested for curing speed and conversion of polymerization (degree of curing) by the use of a photo-differential scanning calorimeter (produced by Seiko Denshi K.K. and marketed under the product code of "Photo-DSC: PD 150")

The curing speed was determined by exposing a sample at a fixed temperature (25° C.) to a visible light having a wavelength of 436 nm and a light intensity of 52 mw/cm$^2$, measuring the amount of heat generated in consequence of the ensuing polymerization, entering the results of this measurement in a graph, and analyzing the inclination of the calory curve in the graph.

The conversion of polymerization was determined by measuring the total amount of heat of polymerization generated by a sample with a differential scanning calorimeter (produced by Seiko Denshi K.K. and marketed under product code of "DSC: DSC 200") and comparing the total heat of polymerization with the amount of heat measured previously.

The sample was prepared by adding to the resin described above a visible light-curing composition consisting of 0.1336 part by weight of a photoreducing dye indicated in Table 1, 1.5 parts by weight of tribenzylamine, and 1 part by weight of benzoyl peroxide.

The curing speed and the conversion of polymerization were as shown in Table 1.

TABLE 1

| Example | Photoreducing dye | Curing speed (μw/min) | Conversion of polymerization (%) |
|---|---|---|---|
| 1 | Rose bengal | 3,133 | 54 |
| 2 | Eosin | 8,025 | 53 |

The curing speed was reported as the speed of heat generation per g.

EXAMPLES 3 TO 9 AND COMPARATIVE EXPERIMENTS 1 AND 2

Mixtures were prepared by adding 0.1336 part by weight of rose bengal, 1.5 parts by weight of tribenzylamine, and 1.0 part by weight of a varying peroxide indicated in Table 2 to 100 parts by weight of the same resin as used in Example 1. They were tested for curing speed and conversion of polymerization by following the procedure of Examples 1 and 2.

TABLE 2

| | Peroxide | Curing speed (μw/min) | Conversion of polymerization (%) |
|---|---|---|---|
| Example | | | |
| 3 | Perbutyl Z | 4180 | 71 |
| 4 | Perbutyl IF | 6200 | 51 |
| 5 | Percumyl H | 2230 | 54 |
| 6 | Perloyl L | 7180 | 69 |
| 7 | Perloyl TCP | 7480 | 61 |
| 8 | Perbutyl O | 3020 | 47 |
| 9 | Perbutyl I | 2960 | 52 |
| Comparative Experiment | | | |
| 1 | Perhexa 3M | 38 | 31 |

TABLE 2-continued

| | Peroxide | Curing speed (μw/min) | Conversion of polymerization (%) |
|---|---|---|---|
| 2 | Percumyl D | 16 | 22 |

Perbutyl Z: t-Butyl peroxy benzoate
Perbutyl IF: Di-(t-butyl peroxy)isophthalate
Percumyl H: Cumene hydroperoxide
Perloyl L: Lauroyl peroxide
Perloyl TCP: Bis-(4-t-butyl cyclohexyl)peroxy dicarbonate
Perbutyl O: t-Butyl peroxy-2-ethylhexanoate
Perbutyl I: t-Butyl peroxyisopropyl carbonate
Perhexa 3M: 1,1-Bis(t-butyl peroxy)3,3,5-trimethyl cyclohexane
Percumyl D: Dicumyl peroxide The above-mentioned peroxides are products of Nippon Oil and Fats Co., Ltd.

From the results of Examples 1 to 9 and Comparative Experiments 1 and 2 shown in Table 1 and Table 2, it is noted that the kinds of peroxides which are usable in the visible light curing composition can be clearly discriminated from those not usable.

Perhexa 3M of Comparative Experiment 1, for example, is one of peroxy ketals. Since it was not subjected to decomposition by sensitization, the mixture of Comparative Experiment 1 showed very low conversion of polymerization and curing speed as compared with the mixtures of Examples 1 to 9.

It is further noted from the results of Table 1 and Table 2 that of the peroxides contained in the curing compositions, those having a carbonyl group adjoining an oxygen-oxygen bond or possessing a hydroperoxy group were effective.

The peroxides used in Examples 1 to 9 fulfill the aforementioned conditions, whereas peroxy ketals and dialkyl peroxides (Percumyl D, for example) are devoid of both the carbonyl group and hydroperoxy group.

EXAMPLE 10

A mixture prepared by adding 0.1336 part by weight of rose bengal, 1.5 parts by weight of tribenzylamine, 0.5 part by weight of benzoyl peroxide, and 0.5 part by weight of t-butyl peroxy benzoate to 100 parts by weight of the same resin as used in Example 1 was tested for curing speed and conversion of polymerization by following the procedures of Examples 1 and 2.

As a result, the curing speed was found to be 4,070 μw/min. and the conversion of polymerization was found to be 67%.

These results were equal to those exhibited by the mixtures of Examples 1 to 9.

COMPARATIVE EXPERIMENTS 3 TO 10

Mixtures were prepared by adding to the same resin as used in Example 1 the varying photocuring compositions indicated in Table 3. They were tested for curing speed and conversion of polymerization by following the procedures of Examples 1 and 2.

TABLE 3

| | Comparative Experiment | | | | | | | |
|---|---|---|---|---|---|---|---|---|
| Curing agent | 3 | 4 | 5 | 6 | 7 | 8 | 9 | 10 |
| CQ | 1 | | | | | | | |
| Benzil | | 1 | | | | | | |
| Eosin | | | 0.0334 | 0.1 | | | | |
| RBG | | | | | 0.1 | | | 0.1336 |
| PDO | | | 0.1 | | | | | |
| TBA | | | | .3 | | | 1.5 | |
| DMEA | | | | | 5 | 5 | | |
| NEM | 3 | | | | | | | |
| TEA | | 3 | | | | | | 1.5 |
| UN | | | | | | | 0.1336 | |

TABLE 3-continued

| Curing agent | Comparative Experiment | | | | | | | |
|---|---|---|---|---|---|---|---|---|
| | 3 | 4 | 5 | 6 | 7 | 8 | 9 | 10 |
| APS | | | | | | 1 | | |
| BPO | | | | | | | | 1 |
| Curing speed (uw/min) | 22600 | 36 | 2840 | 8 | 6 | 4150 | 95 | 1200 |
| Conversion of polymerization (%) | 42 | 54 | 29 | 32 | 28 | 38 | 29 | 12 |

The numerals entered in the table represent the contents of relevant components expressed in part by weight.

The acronyms indicated in Table 3 stand for the following compounds.
CQ: Camphorquinone
RBG: Rose bengal
PDO: 1-Phenyl-1,2-propane-2-(o-ethoxycarbonyl)oxime
TBA: Tribenzylamine
DMEA: Dimethylethylamine
NEM: N-ethyl morpholine
TEA: Triethylamine
UN: Uranin
APS: 2,4,6-Triethyl benzoyl diphenyl phosphine oxide
BPO: Benzoyl peroxide The amounts of these compounds added per 100 parts by weight of the resin and the results of the test are shown in Table 3.

Comparison of the results of Examples 1 to 9 in Tables 1 and 2 with those of Comparative Experiments 3 to 10 in Table 3 reveals that the mixture of Examples 1 to 9 showed lower curing speeds than that of Comparative Experiment 3 and showed conversions of polymerization 10 to 60% higher than that of Comparative Experiment 3.

As compared with the mixture of Comparative Experiment 4, the mixtures of Examples 1 to 9 showed roughly equal conversions of polymerization and curing speeds nearly 100 times as high.

Comparison of the results of Comparative Experiments 5 to 8 with those of Examples 1 to 9 reveals that the mixtures of Examples 1 to 9 excelled those of Comparative Experiments 5 to 8 in either or both of conversion of polymerization and curing speed.

The mixture of Comparative Experiment 9 was clearly inferior in both curing speed and conversion of polymerization to the mixtures of Examples 1 to 9. This is because uranin used in Comparative Experiment 9 is not embraced by the structure of the photoreducing dye to be used in the present invention.

As regards tertiary amines other than tribenzylamine, the mixture of Comparative Experiment 10 which contained triethylamine showed a slow curing speed and a low conversion of polymerization.

In the curing by exposure to visible light as described above, none of the conventional techniques simultaneously fulfilled the requirements of fast curing speed and high conversion of polymerization. The compositions of this invention for causing required curing on exposure to visible light fulfilled these requirements at the same time.

EXAMPLES 11 TO 16 AND COMPARATIVE EXPERIMENTS 11 AND 12

Mixtures prepared by adding to the same resin as used in Example 1 the varying photocuring compositions indicated in Table 4 below were tested for curing time and Barcol hardness by the following methods.

The methods used for the test were as follows.

In a glass petri dish 5.0 cm in diameter and 1.5 cm in height, 7.0 g of a given resin composition containing a photocuring agent was placed and left curing at a distance of 7.0 cm directly below six 20-W daylight-color fluorescent lamps (with a total illuminance of about 20,000 luxes).

The curing time was determined by placing a thermocouple at the center of the resin, measuring the heat of curing, plotting the measurement results in a graph, and analyzing the heat curve in the graph.

On the day following the test for curing time, the hardness on the obverse and reverse sides of the hardened resin relative to the light for illumination was measured by the use of a Barcol hardness meter, Type 934-1.

The results were as shown in Table 4.

TABLE 4

| Curing agent | Example | | | | | | Comparative Experiment | |
|---|---|---|---|---|---|---|---|---|
| | 11 | 12 | 13 | 14 | 15 | 16 | 11 | 12 |
| RBG | 0.0334 | 0.5 | 0.1336 | | 0.1336 | 0.1336 | 0.014 | 0.1336 |
| Eosin | | | | 0.1336 | | | | |
| TBA | 3 | 3 | 0.5 | 5 | 1.5 | 1.5 | 3 | 0.08 |
| BPO | 0.5 | 0.5 | 0.5 | | 1 | 4 | 0.5 | 0.5 |
| TBPB | | | | 0.5 | | | | |
| Curing time (min) | 5.6 | 6.5 | 12.2 | 7.5 | 5.9 | 6.8 | 22.0 | 38 |
| Hardness | | | | | | | | |
| Obverse side | 35 | 35 | 37 | 35 | 40 | 40 | 9 | 8 |
| Reverse side | 37 | 35 | 39 | 37 | 44 | 44 | 10 | 10 |

In the Table, TBPB stands for t-butyl peroxy benzoate.

In Table 4, Comparative Experiment 11 proved to be a case in which an insufficient amount of photoreducing dye was used and Comparative Experiment 12 a case in which an insufficient amount of tribenzylamine was used. In both of these cases, the curing time was long, the hardness was low, and the cured resin was viscid on both obverse and reverse sides as compared with the mixtures of Examples 11 to 16.

In contrast, in Examples 11 and 16 wherein the components of visible light curing composition were varied within the relevant ranges specified by this invention, the curing times were short, the degrees of hardness of the cured resins were high, and the cured resins were not viscid on both obverse and reverse sides.

COMPARATIVE EXPERIMENTS 13 TO 15

Mixtures prepared by adding to the same resin as used in Example 1 varying visible light-curing compositions indicated in Table 5 were tested for curing time and Barcol hardness by following the procedure of Examples 11 to 16 and Comparative Experiments 11 and 12. The results were as shown in Table 5.

Comparison of the results of Table 4 with those of Table 5 reveals that the resin of Examples 11 to 16 invariably showed high curing speeds and the cured resins invariably showed high degrees of hardness indiscriminately on both obverse and reverse sides as compared with those of Comparative Experiments 13 to 15.

TABLE 5

| Curing agent | Comparative Experiment | | |
|---|---|---|---|
| | 13 | 14 | 15 |
| Eosin | 0.0334 | | |
| CQ | | 1.0 | |
| Benzil | | | 1.0 |
| PDO | 0.1 | | |
| TBA | 3.0 | | |
| NEM | | 3.0 | 4.0 |
| Curing time (min) | 26 | 10 | 24 |
| Hardness | | | |
| Obverse side | 30 | 36 | 24 |
| Reverse side | 4 | 29 | 10 |

EXAMPLES 17 TO 19 AND COMPARATIVE EXPERIMENTS 16 TO 18

Mixtures prepared by adding a photocuring composition of this invention (comprising 0.0334 part by weight of rose bengal, 3 parts by weight of tribenzylamine, and 0.5 part by weight of benzoyl peroxide) to an isophthalic acid type resin, to an epoxy acrylate type resin, and to a bisphenol type resin, and mixtures prepared by adding a conventional photocuring composition (comprising 0.0334 part by weight of eosin, 3 parts by weight of tribenzylamine, and 0.01 part by weight of PDO) to the same resins were tested for curing time and Barcol hardness by following the procedure of Examples 11 to 16 and Comparative Experiments 11 and 12. The results were as shown in Table 6.

TABLE 6

| Kind of resin | Curing time (min) | Hardness | |
|---|---|---|---|
| | | Obverse side | Reverse side |
| Isophthalic acid type (1) | | | |
| Example 17 | 13 | 29 | 34 |
| Comp. Experiment 16 | 45 | 0 | 0 |
| Epoxyacrylate type (2) | | | |
| Example 18 | 21 | 25 | 28 |
| Comp. Experiment 17 | 160 | 0 | 0 |
| Bis-phenol type (3) | | | |
| Example 19 | 11 | 25 | 30 |
| Comp. Experiment 18 | 60 | 0 | 0 |

(1) UPICA 5523 Product of Nippon UPICA K.K.
(2) Ripoxy R802 Product of Showa Kobunshi K.K.
(3) Newtrack 430 Product of Showa Kobunshi K.K.

EXAMPLE 20

A mixture was prepared by adding a visible light curing composition to the same resin as used in Example 1. A sample was taken from this mixture in the same manner as in Examples 11 to 16 and gelled by exposure for 2 minutes to the light in the same photocuring means as used in Example 16. Thereafter, the sample was thermally cured in a constant temperature bath at 120° C. for 20 minutes.

The cured resin consequently obtained exhibited hardness of 43 degrees indiscriminately on the obverse and reverse sides.

Since the visible light curing composition of this invention contained peroxide as a thermal curing agent, it was capable of being cured by both light and heat.

EXAMPLES 21 TO 23 AND COMPARATIVE EXPERIMENTS 19 TO 21

The same resin as used in Example 1 and varying visible light curing compositions were subjected to forming by the filament winding technique.

A pipe was prepared by winding glass fibers parallelly on a mandrel 5 cm in diameter. As concerns the conditions for the filament winding (hereinafter referred to briefly as "FW"), the winding speed was set at 10 m/min, the tension at 1.5 kg, and the pitch at 4 mm. The robing glass used in this case was PA 535 (product of Nitto Boseki Co., Ltd.) and the glass content in FW was 70%.

The photocuring composition used in Examples 21 to 23 comprised 0.133 part by weight of rose bengal, 1.5 parts by weight of tribenzylamine, and 1 part by weight of benzoyl peroxide (having a 10-hour half-life temperature of 74° C.), based on 100 parts by weight of the same resin as used in Example 1.

The thermally curing composition used in Comparative Experiments 19 to 21 comprised 1.0 part by weight of methylethyl ketone peroxide and 0.3 part by weight of 6% cobalt naphthenate.

The FRP pipes of the photocuring compound formed as described above were each cured in a visible light exposure device using a total of six 20-W daylight-color fluorescent lamps disposed concentrically therein. In this case, the distance from the fluorescent lamps to the surface of the pipe was 7 cm and the illuminance was about 20,000 luxes.

The FRP pipes of the thermosetting compound similarly produced were each cured in a constant temperature bath at about 30° C. The condition of curing was evaluated by the palpation and the curing time was measured by clocking the time which elapsed before viscidity was completely lost from the surface. The pipes were removed from the visible light exposure device and the constant temperature bath and, one day after the removal, tested for residual styrene content.

The results were as shown in Table 7.

TABLE 7

| | Example | | | Comparative Experiment | | |
|---|---|---|---|---|---|---|
| | 21 | 22 | 23 | 19 | 20 | 21 |
| Thickness of resin (mm) | 2.6 | 5.2 | 7.8 | 2.9 | 5.7 | 9.1 |
| Residual styrene content* | 4.5 | 4.0 | 3.3 | 5.2 | 4.0 | 4.0 |
| Occurrence | Absent | Absent | Absent | Absent | Absent | Present |

TABLE 7-continued

| | Example | | | Comparative Experiment | | |
|---|---|---|---|---|---|---|
| | 21 | 22 | 23 | 19 | 20 | 21 |
| of cracks | | | | | | |

*The residual styrene content was determined by Yamaoka et al's method (Himeji Technology University Report: 30A, p. 101, 1977).

The FRP pipes of the photocuring compound required about 15 minutes' curing time and those of the thermosetting compound 60 to 90 minutes' curing time, depending on the thickness.

From Table 7, it is clearly noted that the FRP pipes of Examples 21 to 23 could be invariably cured sufficiently with the light, though the thickness of FW was varied from 2.6 mm to 7.8 mm.

It is also noted from the residual styrene contents that the FRP pipes of Examples 21 to 23 possessed at least equal degrees of curing as compared with those of the thermosetting compound (Comparative Experiments 19 to 21).

Further, the curing times for the FRP pipes of the photocuring compound were shorter than those for the FRP pipes of the thermosetting compound.

We claim:

1. A composition for imparting to an unsaturated polyester the property to cure on exposure to visible light, which composition comprises:

(a) an unsaturated polyester;
   (b) a fluorescein compound photoreducing dye having the following structure:

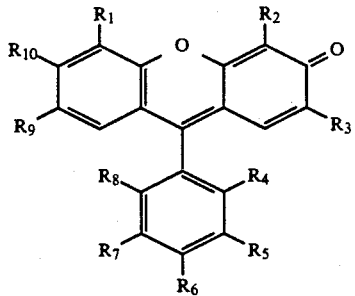

and selected from the group consisting of (1) compounds wherein $R_1$ and $R_2$ are Br, $R_4$ is selected from the group consisting of COONa and COOH, $R_3$ and $R_9$ are selected from the group consisting of $NO_2$ and Br, $R_{10}$ is selected from the group consisting of ONa and OH, and $R_5$, $R_6$, $R_7$ and $R_8$ are H; (2) compounds wherein $R_1$, $R_2$, $R_3$ and $R_9$ are I, $R_4$ is selected from the group consisting of COONa and COOH, $R_{10}$ is selected from the group consisting of ONa and OH, and $R_5$, $R_6$, $R_7$ and $R_8$ are H; (3) compounds wherein $R_1$, $R_2$, $R_3$ and $R_9$ are I, $R_{10}$ is selected from the group consisting of ONa and OH, $R_4$ is selected from the group consisting of COONa and COOH, and $R_5$, $R_6$, $R_7$ and $R_8$ are Cl; and (4) compounds wherein at least one of $R_1$, $R_2$, $R_3$, $R_5$, $R_7$ and $R_9$ is selected from the group consisting of Br, Cl and I, provided that they otherwise are H, $R_4$ is selected from the group consisting of COONa and COOH, and $R_{10}$ is selected from the group consisting of ONa and OH;

(c) tribenzylamine; and
   (d) at least one peroxide selected from the group consisting of diacyl peroxides, peroxy esters and peroxy monocarbonates, said peroxide having a ten-hour half-life temperature of not less than 70° C., the amounts of the components (b), (c), and (d) falling in the range of 0.016 to 1 part by weight, 0.1 to 5 parts by weight and 0.2 to 5 parts by weight, respectively, based on 100 parts by weight of component (a).

2. A composition according to claim 1, which comprises 0.12 to 0.5 part by weight of said fluorescein compound photoreducing dye, 0.5 to 3 parts by weight of said tribenzylamine, and 0.5 to 4 parts by weight of said peroxide.

3. The composition of claim 1, wherein said unsaturated polyester is prepared by the condensation of orthophthalic acid, fumaric acid and propylene glycol in molar proportions of 1:1:2.

4. The composition of claim 1, wherein said unsaturated polyester is prepared from isophthalic acid.

5. A method for the production of a glass fiber-reinforced plastic, comprising the steps of:

mixing glass fibers with 100 parts by weight of an unsaturated polyester resin to obtain a glass fiber-containing resins;
   mixing said glass fiber-containing resin with (a) 0.016 to 1 part by weight of a fluorescein compound photoreducing dye having the following structure:

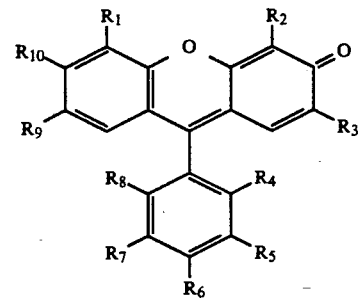

and selected from the group consisting of (1) compounds wherein $R_1$ and $R_2$ are Br, $R_4$ is selected from the group consisting of COONa and COOH, $R_3$ and $R_9$ are selected from the group consisting of $NO_2$ and Br, $R_{10}$ is selected from the group consisting of ONa and OH, and $R_5$, $R_6$, $R_7$ and $R_8$ are H; (2) compounds wherein $R_1$, $R_2$, $R_3$ and $R_9$ are I, $R_4$ is selected from the group consisting of COONa and COOH, $R_{10}$ is selected from the group consisting of ONa and OH, and $R_5$, $R_6$, $R_7$ and $R_8$ are H; (3) compounds wherein $R_1$, $R_2$, $R_3$ and $R_9$ are I, $R_{10}$ is selected from the group consisting of ONa and OH, $R_4$ is selected from the group consisting of COONa and COOH, and $R_5$, $R_6$, $R_7$ and $R_8$ are Cl; and (4) compounds wherein at least one of $R_1$, $R_2$, $R_3$, $R_5$, $R_7$ and $R_9$ is selected from the group consisting of Br, Cl and I, provided that they otherwise are H, $R_4$ is selected from the group consisting of COONa and COOH, and $R_{10}$ is selected from the group consisting of ONa and OH; (b) 0.1 to 5 parts by weight of tribenzylamine; and (d) 0.2 to 5 parts by weight of at least one peroxide selected from the group consisting of peroxy monocarbonates, peroxy esters having a ten-hour half-life temperature of not less than 70° C., and diacyl peroxides having a ten-hour half-life temperature of not less than 70° C. to obtain a mixture; and curing said mixture.

6. A method according to claim 5, wherein said fluorescein compound photoreducing dye is contained in an amount in the range of 0.12 to 0.5 part by weight, said tribenzylamine in an amount in the range of 0.5 to 3 parts by weight, and said peroxide in an amount in the range of 0.5 to 4 parts by weight, based on 100 parts by weight of said unsaturated polyester.

7. A method according to claim 5, wherein the content of the glass fibers in said glass fiber-containing resin is not more than 90% by weight.

8. The method of claim 7, wherein said amount of glass fibers is not greater than 80% by weight.

9. A method according to claim 5, wherein said curing is effected by exposure to visible light.

10. A method according to claim 5, wherein said curing is effected by thermal setting.

11. A method according to claim 5, wherein said curing is effected by both exposure to visible light and thermal setting.

12. A method according to claim 5, wherein said visible light is a light possessing a wavelength in the range of 300 to 600 nm.

* * * * *